United States Patent Office 3,253,495
Patented May 31, 1966

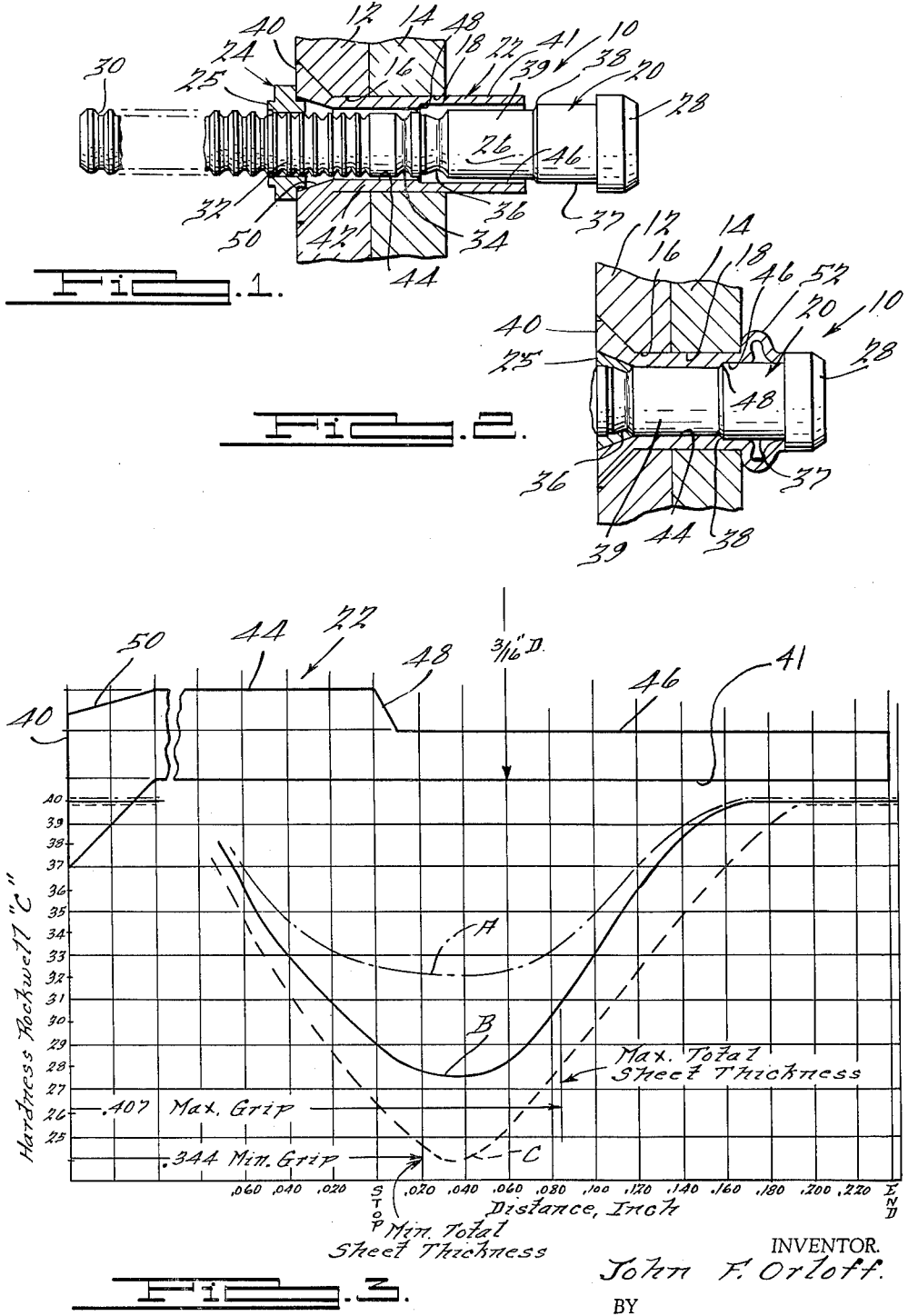

3,253,495
HARDENED BLIND BOLT WITH ANNEALED
SHANK PORTION
John F. Orloff, Mount Clemens, Mich., assignor to Huck
Manufacturing Company, Detroit, Mich., a corporation of Michigan
Filed Dec. 6, 1962, Ser. No. 242,872
5 Claims. (Cl. 85—70)

This invention relates to fastening devices and more particularly to that type of fastening device which forms a head on a blind or inaccessible side of a workpiece.

The type of blind fastener to which the present invention is applicable is comprised of a hollow sleeve having a pin extending therethrough with the sleeve deforming radially outwardly in response to a column load applied thereto via the pin to form thereby a bulbed head. In such fasteners in order to be certain that workpieces to be joined thereby are securely gripped, the bulbed head must be formed adjacent to and in abutment with the inaccessible side of the workpieces. Since the formation of the bulbed head begins at the weakest point on the sleeve, several approaches have been utilized in order to assure that this weakest portion is located proximate the surface at the blind side of the workpieces. One approach is to vary the cross sectional area of the material of the sleeve such as to provide a progressively decreasing section from the end of the sleeve toward the blind side of the workpieces. While this can provide a satisfactory result, it is a relatively expensive solution requiring special tooling, etc. Another attempted solution has been to strain harden the end of the sleeve. This likewise proves difficult to attain since in many instances the sleeve is made by an impacting or cold forming process whereby the entire sleeve is already, initially work-hardened. Thus the addition of the required amount of work hardening to the end portion of the sleeve can be difficult and in some cases impossible to attain.

In order to provide a fastener having high strength properties, it is required that a hardened sleeve be utilized. When the sleeve is hardened by a thermal process, the high temperatures stress relieve the strain hardened portions of the sleeve. Any attempt to appreciably increase the hardness of the end by work hardening the thermally hardened sleeve becomes increasingly difficult as the hardness of the sleeve increases. It is likewise difficult to thermally increase the hardness at the end of a hardened sleeve, since thermal hardening is time consuming, making runout, and hence the location and extent of a gradient, extremely difficult to control.

In view of the above, it is an object of this invention to provide a fastener of the above described type which is simple in construction and which assures the formation of a bulbed head at the proper location adjacent the blind side of a plurality of workpieces to be joined together.

It is another object of the present invention to provide a fastener of the above described type which is simple in construction, having high strength characteristics, and which is assured of forming the blind head adjacent the blind side of a plurality of workpieces to be joined together.

It is still another object of this invention to provide a fastener of the above described type in which the sleeve is generally of a high hardness and which has a portion adjacent the blind side of a plurality of workpieces to be joined together which has a gradient of hardness decreasing in a direction toward the blind side of the workpieces.

Other objects, features, and advantages of the present invention will become apparent from the subsequent description and the appended claims, taken in conjunction with the accompanying drawings, in which:

FIGURE 1 is a side elevational view with some parts shown in section and other parts shown broken away, of a fastener exemplifying the features of this invention and shown in assembly relationship to a pair of workpieces to be joined together;

FIGURE 2 is a view similar to FIGURE 1 showing the fastener after it has been set; and FIGURE 3 is a graphical representation depicting the hardness gradient across the length of the sleeve of the fastener shown in FIGURES 1 and 2.

In general, looking now to FIGURE 1, a fastener exemplifying the features of this invention is indicated by the numeral 10 and is shown in conjunction with a pair of workpieces 12 and 14 having aligned apertures 16 and 18, respectively. The fastener 10 comprises a pin member 20, a hollow sleeve 22 and a locking collar 24. The pin member 20 comprises a shank portion 26 having a plurality of annular pull grooves 30 at one end and terminating in a head portion 28 at its opposite end. Adjacent the pull grooves 30 are a plurality of press fit annular lands 32 which serve a purpose to be seen; an annular breakneck 34 is located between the head portion 28 and the lands 32 while an annular locking groove 36 is disposed between the head portion 28 and the annular breakneck 34. An enlarged diameter portion 37 adjacent the head 28 terminates in a chamfered shoulder 38 which serves a purpose to be described.

The sleeve 22 is hardened to provide increased shear strength and has a tubular body portion composed of an end portion 41 and an intermediate portion 42. A head portion 40 extends from the intermediate portion 42 and has a frusto conically shaped outer surface which is matable within a similarly shaped countersunk portion of the bore 16 in the workpiece 12. A bore 44 extends through the intermediate portion 42 and is coaxially disposed relative to an enlarged diameter bore 46 extending through the end portion 41 and to a chamfered bore 50 located in the head portion 40. A chamfered shoulder 48 is located at the juncture between the bores 44 and 46.

The fastener 10 is assembled with the shank 26 of the pin 20 extending through the bore 44 with the head portion 28 disposed on the side of sleeve 22 opposite its head portion 40. The collar 24, which has a ring portion 25 located at its radially inner extremity, is disposed about the shank 26 and has a bore providing a slight interference fit with lands 32 to thereby maintain the pin 20, sleeve 22, and collar 24 in assembled relationship. The fastener 10 is located within the apertures 16 and 18 in the workpieces 12 and 14 in the manner as shown in FIGURE 1.

In setting the fastener 10, a tool (not shown) of conventional construction is utilized in which a plurality of chuck jaws grip the pull grooves 30 while an anvil abuts against the ring portion 25 of the collar 24. A relative axial force is applied therebetween thus moving the pin 20 axially relative to the sleeve 22 and moving the head portion 28 into abutment with the end portion 41 of the sleeve 22. The enlarged diameter portion 37 adjacent head portion 28 is substantially equal to the diameter of the enlarged bore 46, while the diameter of the straight portion 39 is substantially equal to the diameter of the bore 44. Thus, as the pin 20 is moved axially relative to the sleeve 22, the straight portion 39 is moved into the bore 44 and the enlarged diameter portion 37 is moved into the bore 46. When the head portion 28 of the pin 20 is in abutment with the end portion 41 of sleeve 22 the relative axial force between pin 20 and sleeve 22 results in a columnar load to the sleeve 22 causing it to flow radially outwardly at its weakest point to form a bulbed head 52 at the blind or rearward side of the last workpiece 14. As additional axial force is applied relative to the pin 20 and the sleeve 22, the shoulder 38 is brought into abutment with shoulder 48. As this relative axial force increases to a preselected magnitude, the ring portion 25 of the collar 24 is severed therefrom and driven into the locking groove 36. Note that the stop shoulders 48 and 38 are disposed such that when they are in engagement the locking groove 36 is properly disposed relative to the head portion 40 of the sleeve 42 to receive the ring portion 25 of the collar 24. As further axial force is applied between the sleeve 22 and the pin 20 the end of the pin 20 is severed at the breakneck groove 34, thus completing the setting of fastener 10 and resulting in a construction as shown in FIGURE 2.

As previously mentioned, in order for the fastener 10 to securely hold the sheets or workpieces 12 and 14 together, it is necessary that the bulbed head 52 be formed adjacent the blind or rearward side of the last workpiece 14. Since the end portion 41 of the sleeve 22 has a substantially uniform cross section and/or uniform cross sectional compressive strength over its length, the bulbed head 52 could possibly be formed at some point removed from the rear surface of the last workpiece 14. In order to insure that the bulbed head 52 will always be formed adjacent the rear surface of the last sheet or workpiece 14 and also to provide a fastener having high shear strength characteristics, a section on the end portion 41 of the hardened sleeve 22 is locally annealed to provide a hardness gradient decreasing in a direction from the outer extremity of end portion 41 towards the stop shoulder 48.

Looking now to FIGURE 3, a section of the sleeve 22 is shown on a graph depicting the relationship of hardness vs. distance long the length of the sleeve. In practice, a particular fastener of the above described type is utilized for a range of total thicknesses of workpieces 12 and 14 extending from a minimum to a maximum total thickness. For purposes of example the sleeve 22 of FIGURE 3 is shown to have a nominal diameter of 3/16" and a grip range varying from a minimum of .344" to a maximum of .407". These minimum and maximum grip dimensions, of course, indicate the range of total thickness of workpieces 12 and 14 for which that particular fastener can be effectively used. The sleeve 22, to have high shear strength, is hardened as by a thermal process and is annularly tempered or softened approximately in the region of the stop shoulder 48 to provide a structure to be presently described. Each of the curves A, B and C depict a hardness traverse along the sleeve 22 for different degrees of tempering with the amount of tempering increasing from curve A to curve C. The hardness, of course, is a direct indication of the strength of the sleeve 22. In order to insure that the bulbing will always occur at the rear surface of the last sheet 14 for any total sheet thickness within the minimum-maximum grip range, the hardened sleeve 22 is tempered whereby the hardness decreases in the direction from the outer extremity of end portion 41 towards the stop shoulder 48. The hardness gradient begins with a maximum hardness at a point axially beyond the maximum grip line and decreases to a minimum hardness at a point proximate to the minimum grip line. From the minimum hardness point, the hardness increases at a rapid rate, i.e. hardness/linear distance, in a direction toward the head portion 40. In the fastener of FIGURE 3 the hardness reaches its maximum magnitude in a direction from the minimum hardness point towards the head portion 40 within approximately 1/16" of the shoulder 48. Thus the remainder of the sleeve 22, which is the portion to be subjected to high shear loads, is of the original high hardness and thus has a high shear strength.

The gradient as shown in FIGURE 3 can be provided by annealing or tempering a narrow annular section about the sleeve 22 in a location between the maximum and minimum grip lines as shown in FIGURE 3. Since annealing or tempering can be performed within a relatively short period of time a gradient is quite readily obtainable. By initially starting with a hardened sleeve and then annealing or tempering only a selected portion to provide the gradient shown in FIGURE 3, the sleeve 22 of a given material can be hardened to and except for the tempered portion, maintained at the maximum hardness attainable for that material thus providing for a sleeve of maximum hardness with bulbing assured to occur at the desired location.

If the material of the sleeve 22 is hardened steel or steel alloy, the microstructure will be essentially martensitic. Upon annealing or tempering a band or section as indicated by FIGURE 3, the result will be a structure having a gradient in the amount or degree of temper of the martensite. Thus at a point of minimum hardness of the curves A, B and C, the martensite will be tempered by the greatest amount with the amount of temper decreasing in a direction along the curve outwardly toward the termination of the end portion 41 and also decreasing in an opposite direction from the point of minimum hardness towards the head portion 40. The above is not limited to steel alloys but is true also for other materials undergoing a martensitic transformation as a result of thermal processing.

The martensitic transformation referred to is one type of allotropic transformation which occurs as a result of thermal processing. While the broad scope of allotropic transformations in materials includes but is not restricted to martensitic transformations, it is believed that the end result is similar in that any material undergoing an allotropic transformation provides, between the different allotropic states, a differential in hardness and a corresponding differential in strength. Thus it is believed that similar results can be achieved for a sleeve 22 constructed of any material undergoing an allotropic transformation as a result of thermal processing.

In a precipitation hardenable alloy having soluble and solute phases and which does not undergo an allotropic transformation, e.g. aluminum alloys, annealing causes greater diffusion of the soluble state resulting in a different type of change in structure from that described above relative to the annealing of the hardened steel alloy. At the point of minimum hardness at the curves A, B and C there occurs a lesser degree of dispersion of the soluble phase with the degree of dispersion increasing in a direction along the curve outwardly toward the termination of the end portion 41 and also increasing in an opposite direction towards the head portion 40.

Thus, with the fastener 22 constructed in a manner described, very definite structural variations can be discerned along the hardness gradient on the sleeve resulting in a sleeve which has maximum strength and which will always provide bulbing at the rear surface of the last sheet of a plurality of workpieces within the grip range of that fastener.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A fastener for securing workpieces having aligned openings and varying in total thickness from a minimum to a maximum comprising:

a tubular sleeve member and a pin, said tubular sleeve member having a preselected shape and comprising a head portion adapted to engage the forward surface of the workpieces and a tubular body portion of a preselected length extending from said head portion and adapted to extend through the opening and beyond the rear surface of the workpieces, said tubular body portion being hardened throughout its length to a selected hardness providing a preselected differential of hardness above the hardness of the material of said sleeve member in an unhardened condition with said selected hardness being greater than the general hardness of said sleeve member attained as the result of its formation into said selected shape, an annealed portion on said body portion having a gradient of hardness decreasing from said selected hardness in an axial direction from a point a preselected distance beyond the rear surface of the workpiece of maximum thickness to a different point substantially at the rear surface of the workpieces of minimum thickness and increasing from said different point towards said head portion, said annealed portion defining the softest portion of said body portion, said pin comprising a shank extensible through said sleeve member and terminating in a head positioned at the opposite end of said sleeve opposite said head portion, means on said head and said opposite end for forming a bulbed head on said tubular portion in the area of said gradient of decreasing hardness as a relative axial force is applied between said pin and said sleeve member in one direction, said preselected differential of hardness being at least equal to the differential in hardness over said gradient of decreasing hardness with said gradient of decreasing hardness decreasing at a selected rate having a magnitude for insuring the formation of said bulbed head along said gradient of decreasing hardness in engagement with the rear surface of the workpieces varying in total thickness from the minimum to the maximum total thickness.

2. A fastener for securing workpieces having aligned openings and varying in total thickness from a minimum to a maximum comprising:

a tubular sleeve member and a pin, said tubular sleeve member comprising a head portion adapted to engage the forward surface of the workpieces and a tubular body portion of a predetermined length extending from said head portion and adapted to extend through the openings and beyond the rear surface of the workpieces, said tubular body portion being hardened throughout its length to a selected hardness approximately at the maximum hardness attainable for the material of said sleeve member, an annealed portion on said body portion having a gradient of hardness decreasing from said selected hardness in an axial direction from a point a preselected distance beyond the rear surface of the workpieces of maximum thickness to a different point substantially at the rear surface of the workpieces of minimum thickness and increasing from said different point towards said head portion, said annealed portion defining the softest portion of said body portion, said pin comprising a shank extensible through said sleeve member and terminating in a head positioned at the opposite end of said sleeve opposite said head portion, means on said head and said opposite end for forming a bulbed head on said tubular portion in the area of said gradient of decreasing hardness as a relative axial force is applied between said pin and said sleeve member in one direction, said gradient of decreasing hardness decreasing at a selected rate having a magnitude for insuring the formation of said bulbed head along said gradient of decreasing hardness in engagement with the rear surface of the workpieces varying in total thickness from the minimum to the maximum total thickness.

3. A fastener for securing workpieces having aligned openings and varying in total thickness from a minimum to a maximum comprising:

a tubular sleeve member constructed of a material undergoing an allotropic transformation during heat treatment and a pin, said tubular sleeve member having a preselected shape and comprising a head portion adapted to engage the forward surface of the workpieces and a tubular body portion of a preselected length extending from said head portion and adapted to extend through the openings and beyond the rear surface of the workpieces, said tubular body portion being hardened throughout its length to a hardness providing a preselected differential of hardness above the hardness of the material of said sleeve member in an unhardened condition with said selected hardness being greater than the general hardness of said sleeve member attained as the result of its formation into said preselected shape, an annealed portion on said body portion having a gradient of hardness decreasing from said hardness from one allotropic state in an axial direction at a point a preselected distance beyond the rear surface of the workpieces of maximum thickness to another allotropic state at a different point substantially at the rear surface of the workpieces of minimum thickness and increasing from said different point towards said head portion, said annealed portion defining the softest portion of said body portion, said pin comprising a shank extensible through said sleeve member and terminating in a head positioned at the opposite end of said sleeve opposite said head portion, means on said head and said opposite end for forming a bulbed head on said tubular portion in the area of said gradient of decreasing hardness as a relative axial force is applied between said pin and said sleeve member in one direction, said preselected differential of hardness being at least equal to the differential in hardness over said gradient of decreasing hardness with said gradient of decreasing hardness decreasing at a rate having a magnitude for insuring the formation of said bulbed head along said gradient of decreasing hardness in engagement with the rear surface of the workpieces varying in total thickness from the minimum to the maximum total thickness.

4. A fastener for securing workpieces having aligned openings and varying in total thickness from a minimum to a maximum comprising:

a tubular sleeve member constructed of a precipitation hardenable alloy having a soluble phase and a solute phase with the hardness of the alloy decreasing with a reduction in the degree of dispersion of the soluble phase and a pin, said tubular sleeve member having a preselected shape and comprising a head portion adapted to engage the forward surface of the workpieces and a tubular body portion of a preselected length extending from said head portion and adapted to extend through the opening and beyond the rear surface of the workpieces, said tubular body portion being hardened throughout its length to have a substantial degree of dispersion to produce a selected hardness providing a preselected differential of hardness above the hardness of the material of said sleeve member in an unhardened condition with said selected hardness being greater than the general hardness of said sleeve member attained as the result of its formation into said selected shape, an annealed portion on said body portion having a gradient of hardness decreasing from said selected hardness in an axial direction from a point a preselected distance beyond the rear surface of the workpiece of maximum thickness to a different point substantially at the rear surface of the workpieces of minimum thickness and increasing from said different point towards said head portion, said annealed portion defining the softest portion of said body portion, said pin comprising a shank extensible through said sleeve member and terminating in a head positioned at the opposite end of said sleeve opposite said head portion, means on said head and said opposite end for forming a bulbed head on said tubular portion in the area of said gradient of decreasing hardness as a relative axial force is applied between said pin and said sleeve member in one direction, said preselected differential of hardness being at least equal to the differential in hardness over said gradient of decreasing hardness with said gradient of decreasing hardness decreasing at a selected rate having a magnitude for insuring the formation of said bulbed head along said gradient of decreasing hardness in engagement with the rear surface of the workpieces varying in total thickness from the minimum to the maximum total thickness.

5. A fastener for securing workpieces having aligned openings and varying in total thickness from a minimum to a maximum comprising:

a tubular sleeve member constructed of a material undergoing a martensitic transformation during heat treatment and a pin, said tubular sleeve member having a preselected shape and comprising a head portion adapted to engage the forward surface of the workpieces and a tubular body portion of a preselected length extending from said head portion and adapted to extend through the opening and beyond the rear surface of the workpieces, said tubular body portion being hardened throughout its length to have a substantial martensitic microstructure to produce a selected hardness providing a preselected differential of hardness above the hardness of the material of said sleeve member in an unhardened condition with said selected hardness being greater than the general hardness of said sleeve member attained as the result of its formation into said selected shape, an annealed portion on said body portion having a gradient of hardness decreasing from said selected hardness in an axial direction from a point a preselected distance beyond the rear surface of the workpiece of maximum thickness to a different point substantially at the rear surface of the workpieces of minimum thickness and increasing from said different point towards said head portion, said annealed portion defining the softest portion of said body portion, said pin comprising a shank extensible through said sleeve member and terminating in a head positioned at the opposite end of said sleeve opposite said head portion, means on said head and said opposite end for forming a bulbed head on said tubular portion in the area of said gradient of decreasing hardness as a relative axial force is applied between said pin and said sleeve member in one direction, said preselected differential of hardness being at least equal to the differential in hardness over said gradient of decreasing hardness with said gradient of decreasing hardness decreasing at a selected rate having a magnitude for insuring the formation of said bulbed head along said gradient of decreasing hardness in engagement with the rear surface of the workpieces varying in total thickness from the minimum to the maximum total thickness.

References Cited by the Examiner
UNITED STATES PATENTS

| | | | |
|---|---|---|---|
| 1,814,966 | 7/1931 | Rosenberg | 85—37 |
| 2,030,169 | 2/1936 | Huck | 85—40 |
| 2,371,459 | 3/1945 | Mittelmann | 148—144 |
| 2,397,111 | 3/1946 | Huck | 85—72 |
| 2,466,811 | 4/1949 | Huck | 70—78 |

EDWARD C. ALLEN, *Primary Examiner.*

C. B. ELDERKIN, *Assistant Examiner.*